United States Patent [19]

Kingston et al.

[11] Patent Number: 5,062,071

[45] Date of Patent: Oct. 29, 1991

[54] PROGRAMMABLE GAIN ACCUMULATOR

[75] Inventors: Samuel C. Kingston; Steven T. Barham, both of Salt Lake City; Harold L. Simonsen, West Valley City, all of Utah

[73] Assignee: Unisys Corp., Blue Bell, Pa.

[21] Appl. No.: 559,019

[22] Filed: Jul. 26, 1990

[51] Int. Cl.[5] .............................................. G06F 7/38
[52] U.S. Cl. .................................................... 364/733
[58] Field of Search .................. 364/733, 736, 715.01; 375/98; 371/37, 46

[56] References Cited

U.S. PATENT DOCUMENTS 4,729,110  3/1988  Welles et al. ................... 364/571.02
4,808,939  2/1989  Kingston ........................... 375/96 X
4,841,552  6/1989  Kingston ........................... 307/512 X Primary Examiner—Gary V. Harkcom
Assistant Examiner—Tan V. Mai
Attorney, Agent, or Firm—John B. Sowell; Mark T. Starr; Thomas J. Scott

[57] ABSTRACT

A programmable digital gain accumulator is provided with a digital accumulator having approximately the same number of significant bits as the input data stream. The most significant bit of the input data stream is a sign bit coupled to a series cascade of flip-flops providing a selectable plurality of flip-flop delay times. The carry output of the accumulator is coupled to an input up/down counter having its output coupled to a multiplexor capable of selecting one of the carry outputs of the input up/down counter. The up or down count is controlled by the sign bit input from the sign bit delay circuit. The output of the multiplexor is inputted to an output up/down counter whose parallel output is the parallel synchronous digital gain command signal for direct use by a utilization device. The up or down count of the output up/down counter is controlled by a delayed sign input from the sign bit delay circuit.

8 Claims, 4 Drawing Sheets

PROGRAMMABLE GAIN ACCUMULATOR

BACKGROUND OF THE INVENTION

1. Field of the Invention

The present invention relates to a novel apparatus for accumulating a number of digital samples from a data stream and programmably scaling or shifting the output data. More particularly, the present invention provides a novel apparatus for communication receivers or signal processing for scaling accumulated data values without the need for shift registers, thus, providing simpler and faster programmable gain accumulators.

2. Description of the Prior Art

Heretofore, digital accumulators have been coupled to output shift registers to provide accumulate and scale devices. Such prior art digital devices are known to require large accumulators and large shift registers which are difficult to build and also require complex associated circuitry. It is very difficult to incorporate such complex accumulate and scale device circuitry into single chip very large scale integrated circuits which require other components such as communications receiver components and/or digital processing circuits.

Accordingly there is an unmet need for a simple, fast and reliable digital programmable gain accumulator which may be easily incorporated into very large scale integrated circuits with other components to provide communication receivers and/or signal processing circuits.

SUMMARY OF THE INVENTION

It is a primary object of the present invention to provide a highly simplified programmable digital gain accumulator circuit which requires less circuit components to build and is easier to implement into integrated circuit devices for multiple uses.

It is another primary object of the present invention to provide a digital gain accumulator for continuously summing data samples from an input data stream and providing output data samples of only the significant bits of the accumulated sample.

It is another primary object of the present invention to provide a digital gain accumulator having a smaller accumulator than prior art accumulator devices and which operates without the need for output shift registers.

It is another primary object of the present invention to provide a synchronous output digital gain accumulator.

It is another object of the present invention to provide a digital gain accumulator which may be employed as an ideal integrator component in digital circuits.

It is another object of the present invention to provide a digital gain accumulator which is capable of being remotely programmed by offchip program commands or gain commands.

It is another object of the present invention to provide a digital gain accumulator which achieves its output gain by multiplexing the carry from the input accumulator rather than shifting the output of a larger accumulator in a shift register as is done in prior art programmable gain accumulators.

According to these and other objects of the having approximately the same number of significant bits as the input data stream. The most significant bit of the input data stream to the accumulator is employed as the input sign bit and is coupled to a cascade of flip-flops which provide delayed input sign bit signals at the respective outputs of the flip-flops. The delayed sign bit signals are then applied to a pair of up/down counters. The input up/down counter is coupled to the carry output of the input accumulator and to a multiplexor which produces a carry signal coupled to the input of an output up/down counter which has its input carry signal controlled as an up or a down count by its delayed sign bit. The output of the output up/down counter is employed as the output of the novel synchronous digital gain accumulator.

DESCRIPTION OF THE PREFERRED EMBODIMENTS

Figure 1:
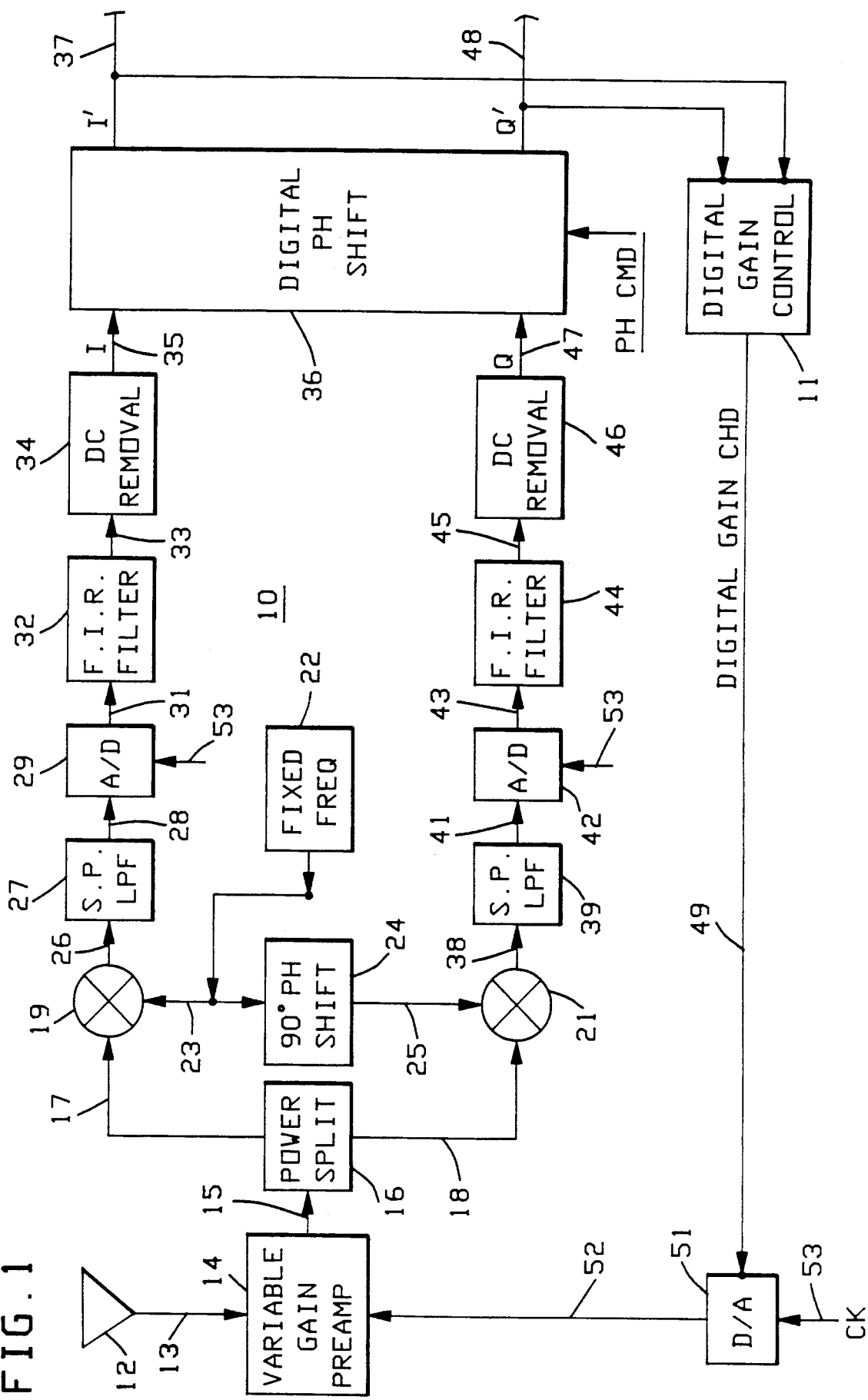
FIG. 1 is a schematic block diagram of a communications receiver pre-processing circuitry illustrating a preferred embodiment use of the present invention programmable digital gain controller.

Refer now to FIG. 1 showing the present invention programmable digital gain controller 11 connected to a data stream of a digital sample data communications receiver 10. The radio frequency signals received by the antenna 12 are coupled via line 13 as analog signals to a variable gain preamplifier 14 to provide a controlled level output signal on line 15 to power splitter 16. The RF analog signal on lines 17 and 18 are applied to a pair of mixers 19 and 21 connected to the real and imaginary channels I and Q respectively. A fixed frequency oscillator 22 has an output on line 23 which is connected to mixer 19 and to a 90° phase shifter 24 which provides a quadrature output on line 25 to mixer 21. The real analog RF signal on line 26 is applied to a single pole low pass filter 27 to provide a filtered analog output signal on line 28. The analog signal at the input of A to D converter 29 is converted to a digital output on line 31 which is applied to a finite impulse response (FIR) filter 32 to provide a filtered digital signal on line 33 which has some D.C. component that is removed by D.C. removal circuit 34 to provide the real digital signal on line 35. The real digital signal on line 35 is applied to a digital phase shifter 36 Of the type set forth in my U.S. Pat. No. 4,841,552 to provide a phase shifted signal on line 37 shown as I'.

In a manner similar to that described above, the output signal on line 38 in the imaginary channel Q is applied to a low pass filter 39 whose output on line 41 is applied to an A to D converter 42. The digital output on line 43 is applied to a filter 44 and the filtered output on line 45 is applied to a D.C. removal circuit 46 of the type which will be explained in greater detail hereinafter to provide the imaginary digital signal Q on line 47. The imaginary signal Q on line 47 is applied to the digital phase shifter 36 of the type described in U.S. Pat. No. 4,841,552 to provide the phase shifted imaginary signal Q' on line 48. The real and imaginary signals on line 37 and 48 are connected to a preferred embodiment digital gain controller 11 to provide a digital gain command on line 49 which is shown connected to digital to analog converter 51. The analog output on line 52 is connected to the analog variable gain preamplifier 14 to control the output signal on line 15 at a predetermined controlled level. When the variable gain preamplifier is provided with a digital input, the digital gain command on line 49 may be coupled directly to the preamplifier 14 so as to eliminate the D to A converter 51. Clock strobe signals such as that shown on line 53 are applied to the digital blocks which occur after the A to D converters 29 and 42. The low pass filters 27 and 39 may be constructed as RC filter circuits and the FIR filters 32 and 44 may be constructed in the manner shown in my U.S. Pat. No. 4,808,939. It will be understood that all of schematic blocks shown in the FIG. 1 embodiment need not be constructed according to my previously mentioned patents but may be constructed by other equivalent circuits known in the prior art.

Figure 2:
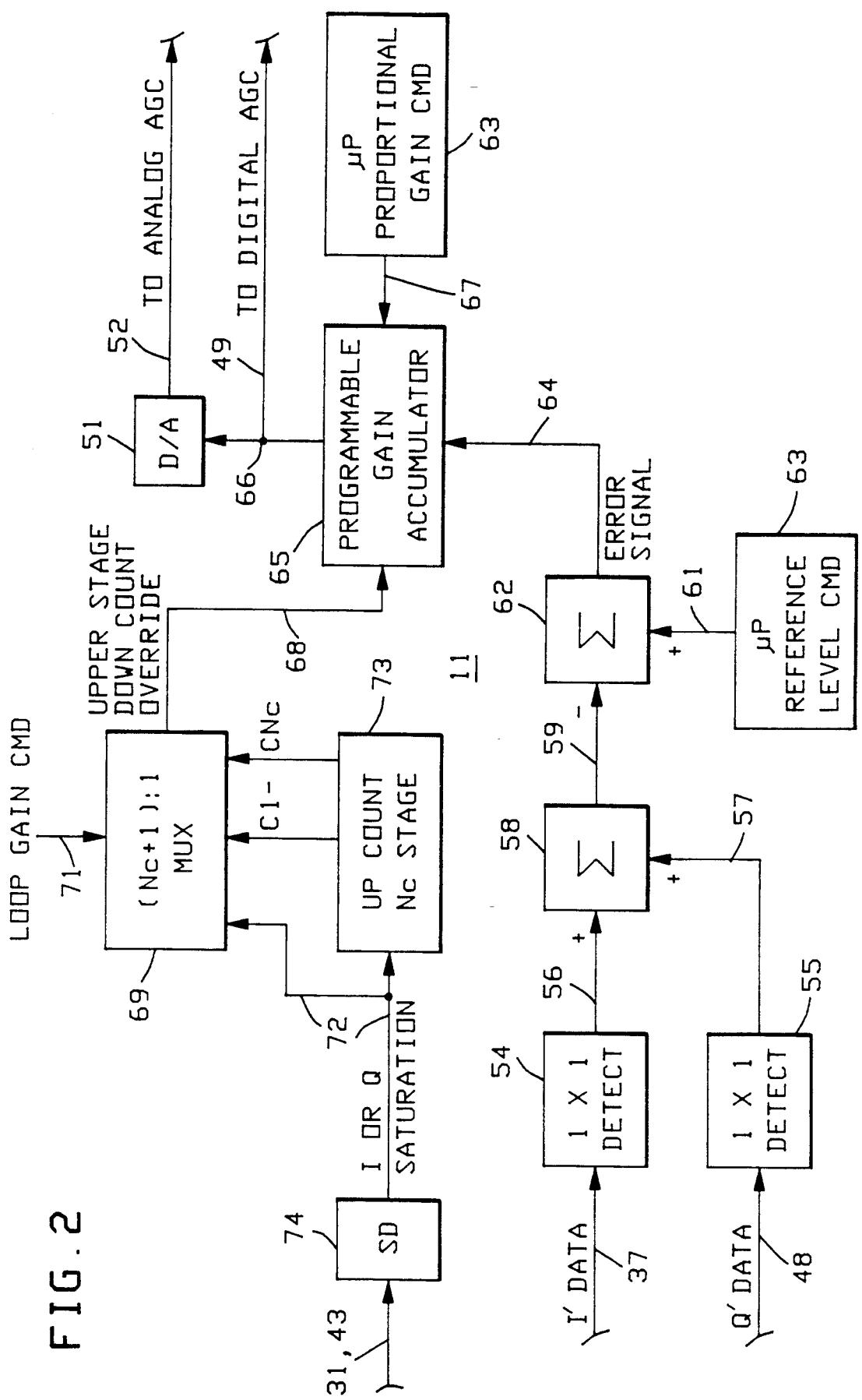
FIG. 2 is a schematic block diagram of a preferred embodiment programmable digital gain controller shown in FIG. 1.

Refer now to FIG. 2 showing a schematic block diagram of the novel preferred embodiment programmable digital gain controller 11 having real and imaginary input signals on input lines 37 and 48. The phase shifter rotated digital data signals on lines 37 and 48 are shown connected to absolute value detectors 54 and 55 which measure the value of the magnitude of the input signals and provide digital magnitude values on output lines 56 and 57 respectively. The signals on line 56 and 57 could be generated by square law detectors instead of absolute value detectors or other equivalent detectors which provide signal magnitude values that are applied to a summing circuit 58 which serves as an adder. The output of the adder 58 on line 59 is subtracted from the level command input on line 61 in comparator or subtractor 62. The microprocessor reference level command is preferably from an offchip microprocessor or controller 63 which permits offchip control. The output of comparator 62 on line 64 provides a digital error signal which is applied to a programmable gain accumulator 65 of the type which continuously accumulates positive and negative error signals to provide a preferred command signal on output line 66. As mentioned hereinbefore, the gain command signal on line 66 may be applied directly to a variable gain preamplifier 14 or converted to an analog signal before being applied to the automatic gain control amplifier described hereinbefore. Accordingly, the D to A converter 51 and the output lines are numbered the same as those in FIG. 1 to show continuity between the drawings.

The same microprocessor 63 which provides the level command may also provide a proportional gain command on line 67 to the programmable gain accumulator 65. A third input on line 68 to programmable gain accumulator 65 is labeled upper stage downcount override signal and is shown as the output of a carry bit select multiplexor 69. The aforementioned microprocessor 63 also provides a loop gain command on line 71 which describes the desired saturation loop gain. Digital signals from the real and imaginary channels I and Q on lines 31 and 43 are shown connected via a saturation detector 74 and line 72 to an up counter 73 shown having $N_c$ stages. The signal on line 72 is derived from the signals on lines 31 and 43 which are applied to a saturation detector 74 and are indicative of whether the I or Q A/D converter values are at maximum or minimum levels. The up counter 73 is synchronized with the system clock so as to continuously count indications of saturation values. The carries from the counter 73 in the different stages are applied to the multiplexor 69 to enable selection of the number of saturation counts per gain override on line 68 to the programmable gain accumulator 65.

Figure 3:
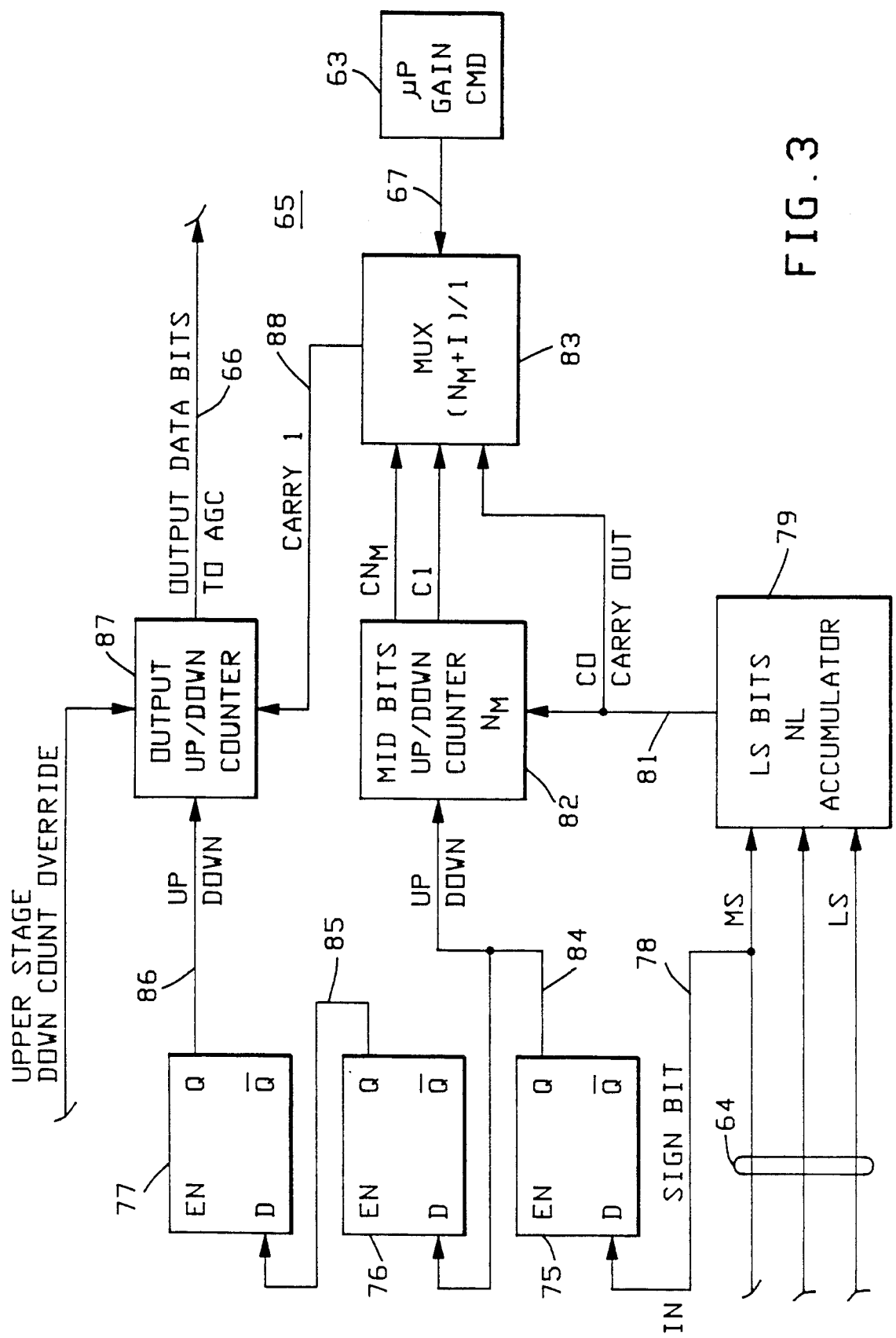
FIG. 3 is a detailed schematic block diagram of a preferred embodiment programmable gain accumulator of the type employed in FIG. 2.

Refer now to FIG. 3 showing a more detailed schematic block diagram of a preferred embodiment programmable gain accumulator of the type employed in FIG. 2. The programmable gain accumulator 65 is shown comprising a plurality of flip-flops connected in cascade one to another having an input sign bit on line 78. Line 78 is the most significant bit of the lines 64 which provide the error signal input. The accumulator 79 is shown having all of the error signal input bits on lines 64 applied thereto to provide a carry out signal on line 81 which is applied to the mid-bits up/down counter 82 and to the carry multiplexor 83. The real or Q output of flip-flop 75 on line 84 applies a delayed version of the input sign bit on line 78 to the mid-bits up/down counter 82 and to the data input of flip-flop 76. The twice delayed input sign bit on line 78 appears as the output of flip-flop 76 on line 85 as the data input to flip-flop 77. The thrice delayed input sign bit on line 78 now appears as the real output from flip-flop 77 on line 86 shown as an input to the output up/down counter 87. If the sign bit on line 78 is negative the signal on line 86 instructs the up/down counter 87 to count down on the appropriate carry input condition on line 88. Also the converse is true when the input sign bit on line 78 is positive the signal on line 86 instructs the up/down counter 87 to count up when the carry on line 88 is in the appropriate state. Thus, the digital output from the programmable gain accumulator 65 is shown as the output from the up/down counter 87 on line 66 as shown in FIG. 2. It will be understood that the control value on line 66 is attempting to maintain a steady state and seeking to make a zero average error signal on line 64 as shown in FIGS. 2 and 3. The carry on line 88 is selected in multiplexor 83 via the gain command on line 67. This allows a selected number of stages to be eliminated from the accumulator. This multiplexor 83 output is registered making it synchronous with the thrice delayed sign bit.

Figure 4:
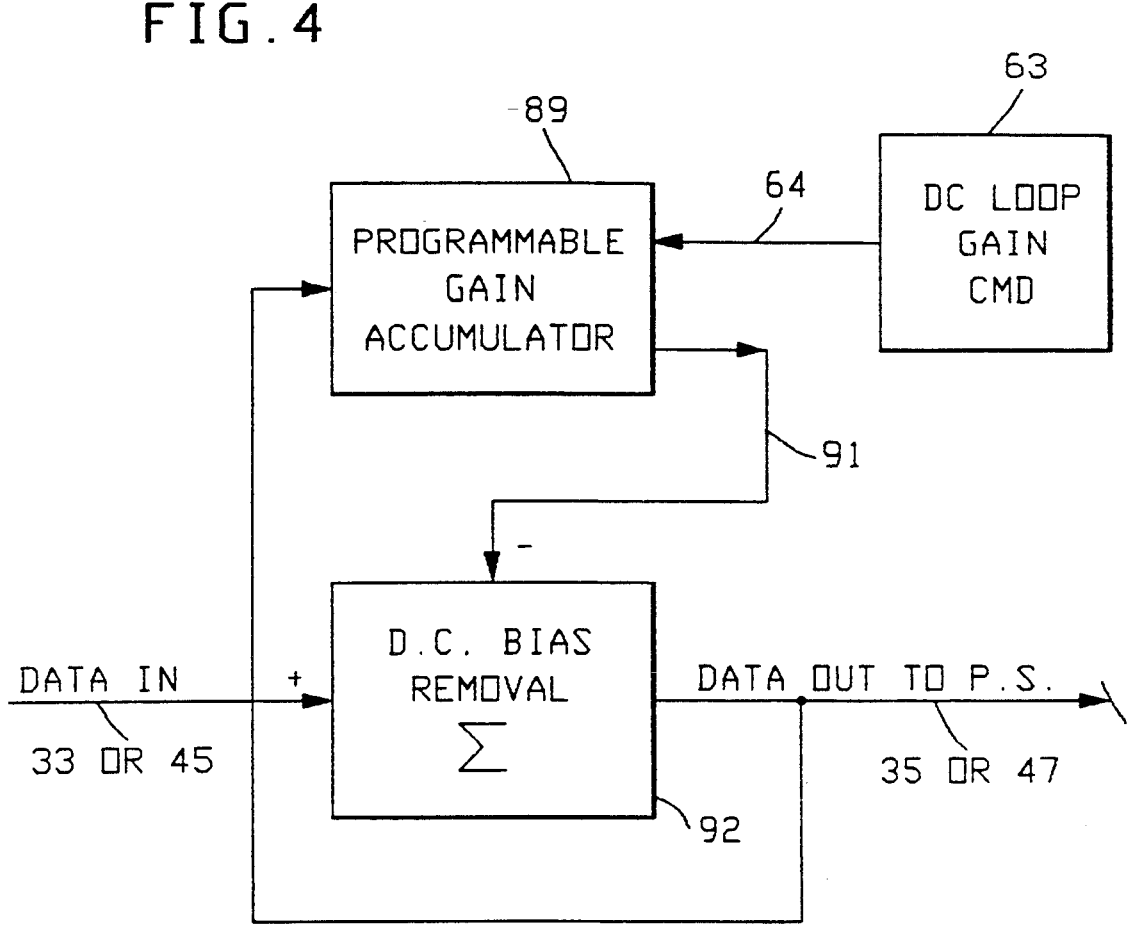
FIG. 4 is a block diagram of the programmable gain accumulator of FIGS. 2 and 3 connected to a bias removal circuit to provide D.C. removal signal processing.

Refer now to FIG. 4 showing a block diagram of a different programmable gain accumulator 89 connected to a bias removal circuit so as to provide D.C. removal signal processing of the type shown in FIG. 1 at blocks 34 and 46. The output of the programmable gain accumulator 89 on line 91 is applied as a negative input to a D.C. bias removal circuit shown as a summing circuit 92, which is shown having a data input line 33 or 45 and a D.C. unbiased data signal output to the phase shifter 36 on output line 35 or 47. In this example of signal processing, a D.C. loop gain command may be provided by the aforementioned microprocessor 63 or preset so as to provide the digital command signal on line 64 to the programmable gain accumulator 89. It will be understood that each of the D.C. removal circuits 34 and 46 may employ a circuit of the type shown in FIG. 4.

Having explained a preferred embodiment digital programmable gain accumulator 65, it will be understood that the circuitry requires fewer components to build and may be easily implemented into integrated circuit chips for multiple uses.

The preferred embodiment programmable gain accumulator provides a synchronous output digital gain accumulator of the type which may be employed as an ideal integrator for various circuit uses. Further, the programmable gain accumulator may be remotely programmable or commandable by a remote microprocessor or a controller. And the novel circuitry of the programmable gain accumulator provides gain by multiplexing the carry rather than shifting the output of the value in the accumulator as was done in prior art variable gain accumulators.

What is claimed is:

1. A programmable digital gain accumulator, comprising:
   a digital accumulator having approximately the same number of significant bits as the input data stream,
   sign bit delay means coupled to the sign bit of said input data stream,
   input up/down counter means coupled to receive a carry output from said digital accumulator and coupled to receive an up or down count control signal from said sign bit delay means,
   multiplexor means having parallel inputs coupled to the output of said input up/down counter,
   a gain control signal coupled to said multiplexor for selecting one of a plurality of said outputs of said input up/down counter, and
   a output up/down counter coupled to receive the output of said multiplexor and coupled to receive an up or down count control signal from said sign bit delay means,
   said count in said output up/down counter providing a parallel synchronous digital gain command signal for direct use by a utilization device.

2. A programmable digital gain accumulator as set forth in claim 1 wherein said sign bit delay means comprises a plurality of flip-flops connected in a series cascade to provide a plurality of flip-flop delay times.

3. A programmable digital gain accumulator as set forth in claim 1 wherein said sign bit delay means comprises three flip-flops connected in series to provide one to three flip-flop sign bit delay times.

4. A programmable digital gain accumulator as set forth in claim 3 wherein said input up/down counter is coupled to the output of the flip-flop providing one flip-flop delay time and said output up/down counter is coupled to the output of said flip-flop providing three flip-flop delay times.

5. A programmable digital gain accumulator of the type set forth in claim 1 wherein said utilization device is a summing circuit connected in series with the input data stream to said digital gain accumulator, an(d wherein the output of said digital gain accumulator is connected to a negative input of said summing circuit to provide a digital data stream output from said summing circuit which has the direct current bias removed.

6. A programmable digital gain accumulator of the type set forth in claim 1 wherein said utilization device is a variable gain amplifier in an automatic gain control loop.

7. A programmable digital gain accumulator of the type set forth in claim 1 wherein said input up/down counter is provided with carry output stages coupled to said multiplexor and one of said carry output stages is selected by said multiplexor as the output carry coupled to said output up/down counter.

8. A programmable digital gain accumulator of the type set forth in claim 7 wherein the output of said output up/down counter is connected in parallel to all of the stages of said output up/down counter.

* * * * *